United States Patent
Jin

(10) Patent No.: US 10,541,723 B2
(45) Date of Patent: Jan. 21, 2020

(54) REDUCE ECHO LEVEL BY SCRAMBLING PHASES OF ECHOES FROM MULTIPLE PORTS IN FDX NODE

(71) Applicant: Cisco Technology, Inc., San Jose, CA (US)

(72) Inventor: Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/005,323

(22) Filed: Jun. 11, 2018

(65) Prior Publication Data

US 2019/0379423 A1 Dec. 12, 2019

(51) Int. Cl.
*H04B 3/20* (2006.01)
*H04B 10/25* (2013.01)

(52) U.S. Cl.
CPC ............... *H04B 3/20* (2013.01); *H04B 10/25* (2013.01)

(58) Field of Classification Search
CPC .................................. H04B 3/20; H04B 10/25
See application file for complete search history.

(56) References Cited

U.S. PATENT DOCUMENTS

| 2003/0016694 A1* | 1/2003 | Schneider ........... H04L 12/2856 370/463 |
| 2010/0183309 A1* | 7/2010 | Etemad ................ H04B 10/505 398/79 |
| 2017/0302378 A1 | 10/2017 | Mutalik et al. |

OTHER PUBLICATIONS

Lu Hongtao et al: "Novel multi-tap analog self-interference cancellation architecture with shared phase-shifter for full-duplex communications", Science China Information Sciences, Science China Press, Heidelberg, vol . 60, no. 10, Mar. 28, 2017 (Mar. 28, 2017), pp. 1-16, XP036201814, ISSN: 1674-733X, DOI: 10.1007/S11432-016-0291-9 [retrieved on Mar. 28, 2017].
European Search report issued in EP Application No. 19179363.7-1219 dated Aug. 4, 2019.

* cited by examiner

*Primary Examiner* — Jianye Wu
(74) *Attorney, Agent, or Firm* — Merchant & Gould P.C.

(57) ABSTRACT

Reduce echo level may be provided by scrambling phases of echoes from multiple ports in a Full Duplex (FDX) node. The FDX node may comprise a transmit portion, a receive portion, and a plurality of ports. The transmit portion may comprise a transmit portion transmit port and a plurality of splitters. The receive portion may comprise a receive portion receive port and a plurality of combiners. The plurality of splitters and the plurality of combiners may scramble phases of completed loops from the transmit portion transmit port to the receive portion receive port resulting from reflections from the plurality of ports.

20 Claims, 6 Drawing Sheets

REDUCE ECHO LEVEL BY SCRAMBLING PHASES OF ECHOES FROM MULTIPLE PORTS IN FDX NODE

TECHNICAL FIELD

The present disclosure relates generally to echo suppression or cancelation.

BACKGROUND

A Hybrid Fiber-Coaxial (HFC) network is a broadband network that combines optical fiber and coaxial cable. It has been commonly employed globally by cable television operators. In a hybrid fiber-coaxial cable network, television channels are sent from a cable system's distribution facility to local communities through optical fiber trunk lines. At the local community, a box translates the signal from a light beam to electrical signal, and sends it over cable lines for distribution to subscriber residences. The optical fiber trunk lines provide adequate bandwidth to allow future expansion and new bandwidth-intensive services.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
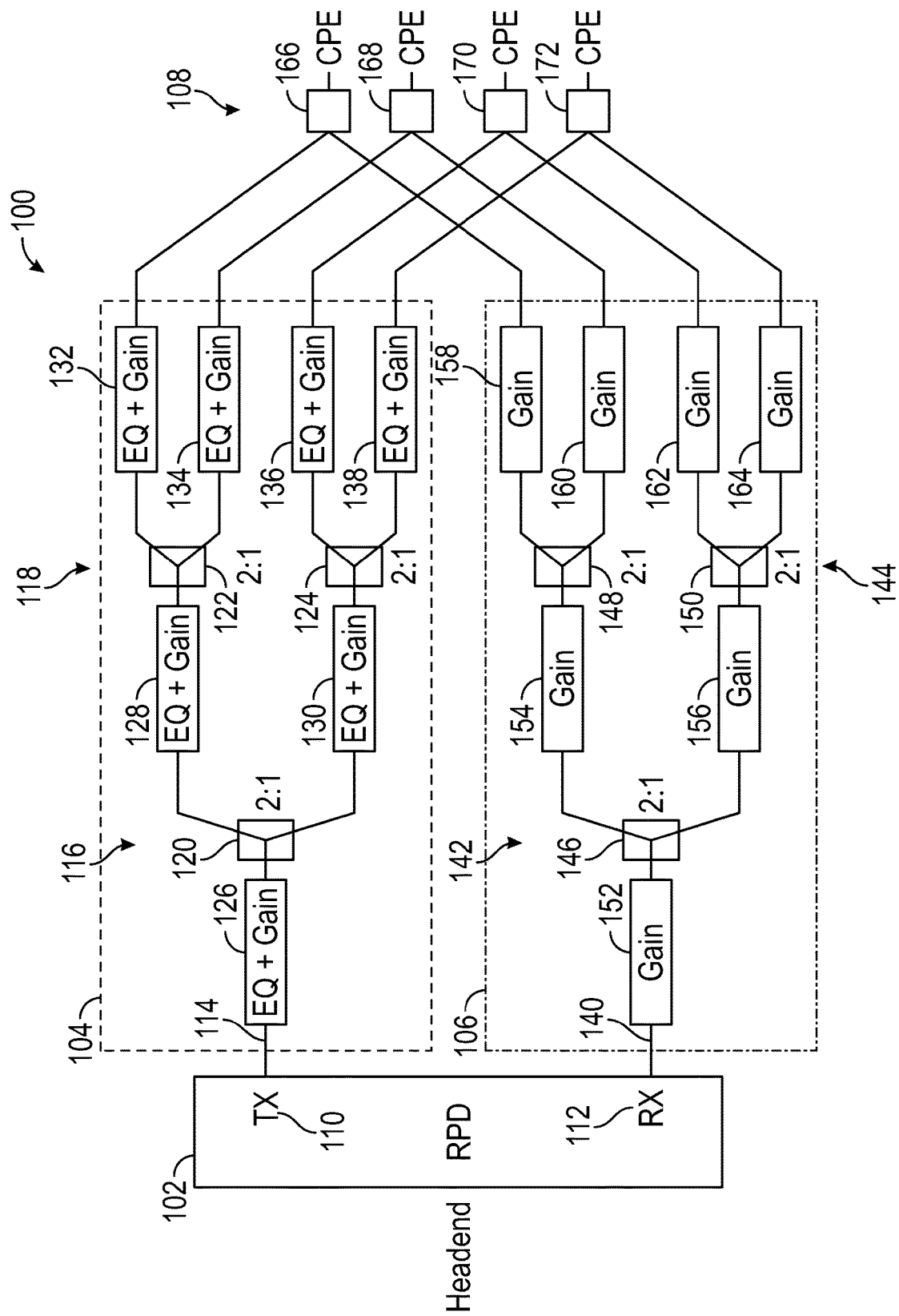
FIG. 1 is a block diagram of a full duplex (FDX) node.

Reduce echo level may be provided by scrambling phases of echoes from multiple ports in a Full Duplex (FDX) node. The FDX node may comprise a transmit portion, a receive portion, and a plurality of ports. The transmit portion may comprise a transmit portion transmit port and a plurality of splitters. The receive portion may comprise a receive portion receive port and a plurality of combiners. The plurality of splitters and the plurality of combiners may scramble phases of completed loops from the transmit portion transmit port to the receive portion receive port resulting from reflections from the plurality of ports.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the-disclosed methods. Accordingly, the following detailed description does not limit the disclosure. Instead, the proper scope of the disclosure is defined by the appended claims.

Multiple-system operators (MSOs) are operators of multiple cable or direct-broadcast satellite television systems. Fiber deep (FD) is a trend in which MSOs push fiber ever closer to customers to provide them with better service. With FD, MSOs may use nodes comprising Full Duplex (FDX) nodes in the HFC. FDX nodes amplify bi-directional full duplex traffic that may simultaneously use frequency spectrum in both the upstream (US) and downstream (DS) directions that may support Data Over Cable Service Interface Specification (DOCSIS) operation. However, with bi-directional full duplex traffic, interferences and echoes may occur in conventional nodes. For example, in operation of an FDX node, echoes coming from four ports may be coherently combined at a Remote Physical Device (RPD) receiver. Because the US desired signals coming from the four ports may be independent and un-coherent, this may lead, for example, to a 12 dB increase on interference to desired signal ratio compared to single port operation. Accordingly, embodiments of the present disclosure may provide avoidance of the coherent combining of echoes from multiple ports.

FIG. 1 is a block diagram of an FDX node 100. As shown in FIG. 1, FDX node 100 may include optical and electrical circuitry and may comprise an RPD 102, a transmit portion 104, a receive portion 106, and a plurality of ports 108. RPD 102 may comprise an RPD transmit port 110 and an RPD receive port 112. An optical fiber cable may be connected to an US side (i.e., RPD 102) of FDX node 100 and a plurality of coaxial cables may be connected to a DS side (i.e., plurality of ports 108) of FDX node 100. The optical fiber cable may be connected to a cable modem termination system (CMTS) in a headend in an HFC network and the plurality of coaxial cables may be connected to Customer Premise Equipment (CPE) of subscribers to the HFC. CPE may comprise, but are not limited to, a cable modem, a cellular base station, a tablet device, a mobile device, a smart phone, a telephone, a remote control device, a set-top box, a digital video recorder, a personal computer, a network computer, a mainframe, a router, or other similar microcomputer-based device. As such, FDX node 100 may facilitate communications between the headend and the CPE.

The CMTS may comprise a device located in a service provider's (e.g., a cable company's) headend that may be used to provide high speed data services, such as cable Internet or Voice-Over-Internet Protocol, to subscribers. Remote physical layer (i.e., RPHY) may comprise shifting or distributing the physical layer (i.e., PHY) of a conventional cable headend CMTS to fiber nodes (e.g., RPHY nodes) in a network. RPD 102 may comprise circuitry to implement the physical layer of the CMTS.

Transmit portion 104 may comprise a transmit portion transmit port 114, a plurality of splitters, and a plurality of equalizer and gain circuits. The plurality of splitters may comprise a first splitter level 116 and a second splitter level 118. First splitter level may comprise a first splitter 120. Second splitter level 118 may comprise a second splitter 122 and a third splitter 124. The plurality of equalizer and gain circuits may comprise a first equalizer and gain circuit 126, a second equalizer and gain circuit 128, a third equalizer and gain circuit 130, a fourth equalizer and gain circuit 132, a fifth equalizer and gain circuit 134, a sixth equalizer and gain circuit 136, and a seventh equalizer and gain circuit 138.

Receive portion 106 may comprise a receive portion receive port 140, a plurality of combiners, and a plurality gain circuits. The plurality of combiners may comprise a first combiner level 142 and a second combiner level 144. First combiner level 142 may comprise a first combiner 146. Second combiner level 144 may comprise a second combiner 148 and a third combiner 150. Plurality gain circuits may comprise a first gain circuit 152, a second gain circuit 154, a third gain circuit 156, a fourth gain circuit 158, a fifth gain circuit 160, a sixth gain circuit 162, and a seventh gain circuit 164.

Elements of FDX node 100 shown in FIG. 1 may be practiced in electrical circuits comprising discrete electronic elements, packaged or integrated electronic chips containing logic gates, a circuit utilizing a microprocessor, or on a single chip containing electronic elements or microprocessors. Furthermore, elements of FDX node 100 shown in FIG. 1 may also be practiced using other technologies capable of performing logical operations such as, for example, AND, OR, and NOT, including but not limited to, mechanical, optical, fluidic, and quantum technologies.

Plurality of ports 108 may comprise a first port 166, a second port 168, a third port 170, and a fourth port 172. Plurality of ports 108 may comprise any number of ports and are not limited to four. DS signal echoes may be present within FDX node 100. For example, DS signal echoes may be present due to reflections of the analog downstream signal in plurality of ports 108 into receive portion 106. Downstream signal echoes may combine with US signals received at plurality of ports 108 from CPE. Because the US desired signals coming from plurality of ports 108 may be independent and un-coherent, this may lead to a an increase on interference to desired signal ratio compared to single port operation. Accordingly, embodiments of the present disclosure may provide avoidance of the coherent combining of echoes from plurality of ports 108. This may be accomplished by selecting two way combiner/splitters used in FDX node 100 and connect them in such a way that the phases of the echoes received by portion 106 resulting from multiple ports may be scrambled over 360 degree for example. Echoes with scrambled phases may not combine coherently, instead, they may cancel out each other.

Figure 2A:
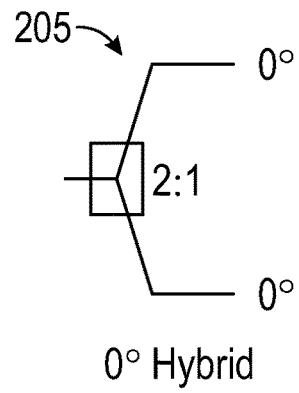
FIG. 2A is a block diagram of a 0 degree power splitter/combiner hybrid.
Figure 2B:
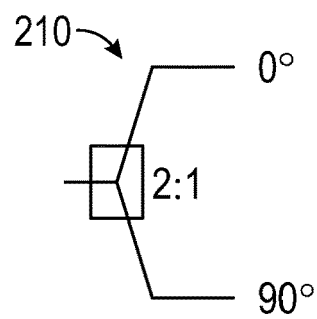
FIG. 2B is a block diagram of a 90 degree power splitter/combiner hybrid.
Figure 2C:
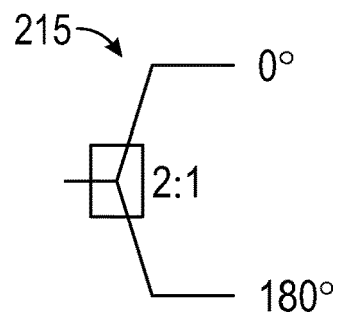
FIG. 2C is a block diagram of a 180 degree power splitter/combiner hybrid.

FIG. 2A is a block diagram of a 0 degree power splitter/combiner hybrid 205, FIG. 2B is a block diagram of a 90 degree power splitter/combiner hybrid 210, and FIG. 2C is a block diagram of a 180 degree power splitter/combiner hybrid 215. Consistent with embodiments of the disclosure, any one or more of the plurality of splitters and any one or more of the plurality of combiners may comprise, for example, 0 degree power splitter/combiner hybrid 205, 90 degree power splitter/combiner hybrid 210, and 180 degree power splitter/combiner hybrid 215.

As shown in FIG. 1, starting from the output of RPD 102 TX (i.e., RPD transmit port 110) and ending at the input of RPD 102 RX (i.e., RPD receive port 112), a path may be defined as a completed loop of DS echoes within FDX node 100. There may be four different loops, for example, respectively corresponding to plurality of ports 108. Two-way power splitter/combiners may be selected and connect in FDX node 100 in such a way that echoes of different loops may be uniformly distributed, for example, over 360 degrees (e.g., 0 degrees, 90 degrees, 180 degrees, 270 degrees).

As shown in FIG. 3, FIG. 4, FIG. 5, and FIG. 6, FDX node 100 may employ two stages of power splitters/combiners (e.g., first splitter level 116 and second splitter level 118 for transmit portion 104, and first combiner level 142 and second combiner level 144 for receive portion 106) for supporting 1x1 FDX segment with four ports for example. Embodiments of the disclosure may mix the 0 degree, 90 degree, and 180 degree power splitter/combiner hybrids shown in FIG. 2A, FIG. 2B, and FIG. 2C respectively, so the phases of the completed loops from RPD transmit port 110 to RPD receive port 112 may be uniformly distributed over 360 degree (e.g., 0 degrees, 90 degrees, 180 degrees, 270 degrees). This may not only avoid the coherent combining of the echoes from plurality of ports 108, but may also help cancel out the echoes if they come in phase (i.e., echoes resulting from the reflections at plurality of ports 108).

Figure 3:
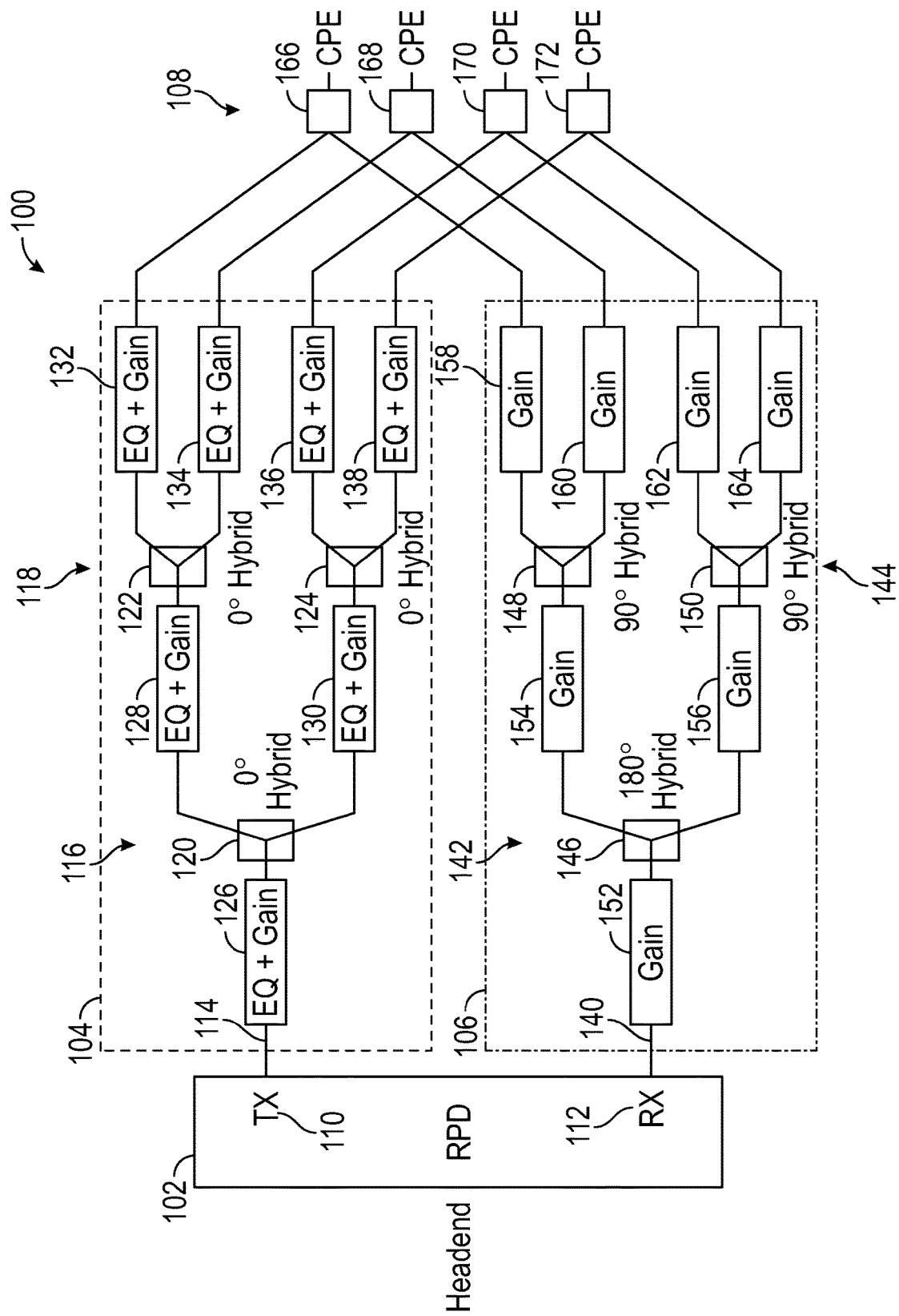
FIG. 3 is a block diagram of a full duplex (FDX) node.

FIG. 3 is a block diagram of FDX node 100 in which the phases of the echoes at RPD receive port 112 comprise 0 degrees from first port 166, 90 degrees from second port 168, 180 degrees from third port 170, and 270 degrees from fourth port 172. In order to accomplish this first splitter 120 may comprise 0 degree power splitter/combiner hybrid 205, second splitter 122 may comprise 0 degree power splitter/combiner hybrid 205, third splitter 124 may comprise 0 degree power splitter/combiner hybrid 205, first combiner 146 may comprise 180 degree power splitter/combiner hybrid 215, second combiner 148 may comprise 90 degree power splitter/combiner hybrid 210, and third combiner 150 may comprise 90 degree power splitter/combiner hybrid 210. Accordingly, embodiments of the disclosure may mix the 0 degree, 90 degree, and 180 degree power splitter/combiner hybrids shown in FIG. 2A, FIG. 2B, and FIG. 2C respectively, so the phases of the completed loops from RPD transmit port 110 to RPD receive port 112 may be uniformly distributed over 360 degree (e.g., 0 degrees, 90 degrees, 180 degrees, 270 degrees).

Figure 4:
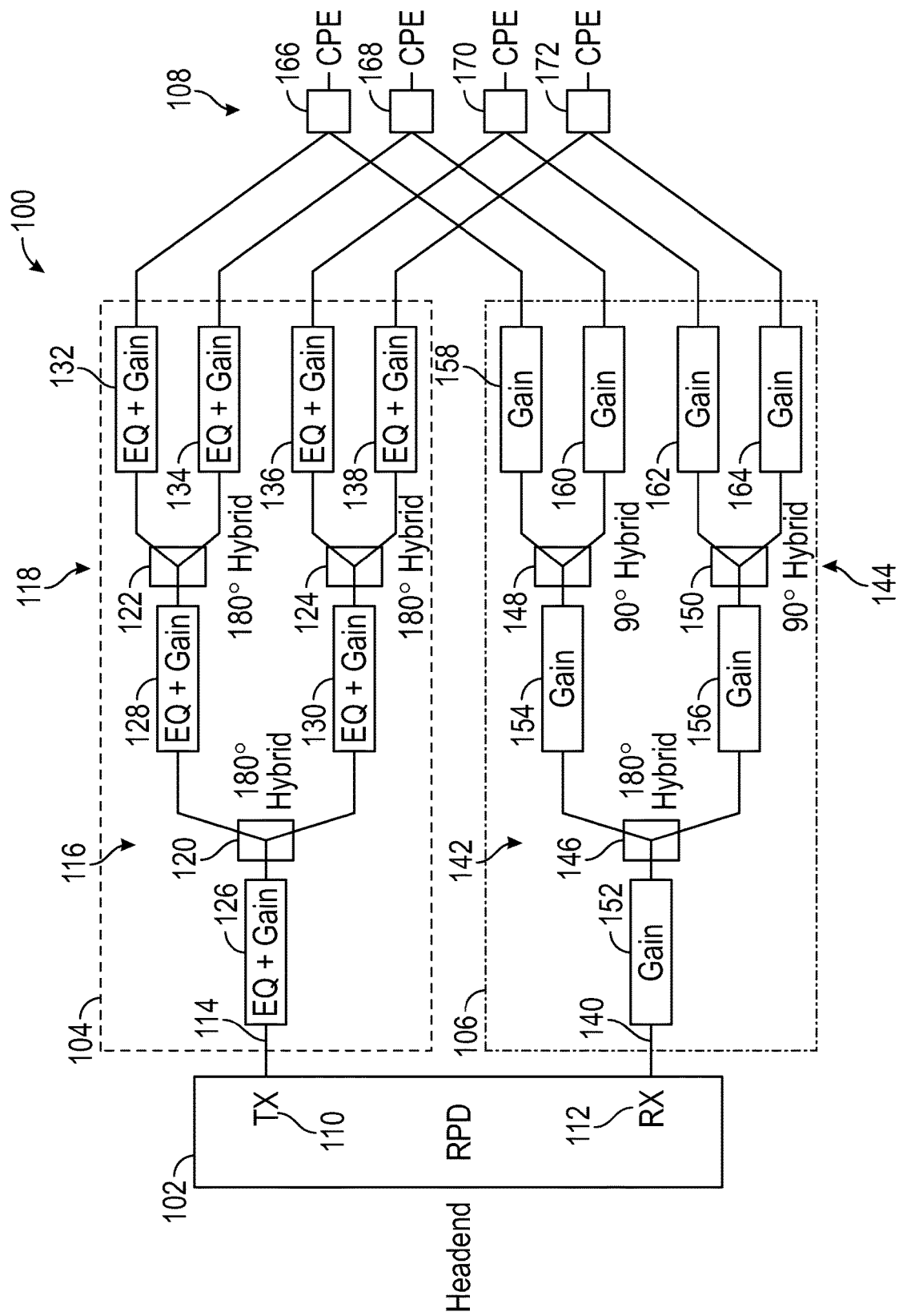
FIG. 4 is a block diagram of a full duplex (FDX) node.

FIG. 4 is a block diagram of FDX node 100 in which the phases of the echoes at RPD receive port 112 comprise 0 degrees from first port 166, 270 degrees from second port 168, 180 degrees from third port 170, and 90 degrees from fourth port 172. In order to accomplish this first splitter 120 may comprise 180 degree power splitter/combiner hybrid 215, second splitter 122 may comprise 180 degree power splitter/combiner hybrid 215, third splitter 124 may comprise 180 degree power splitter/combiner hybrid 215, first combiner 146 may comprise 180 degree power splitter/combiner hybrid 215, second combiner 148 may comprise 90 degree power splitter/combiner hybrid 210, and third combiner 150 may comprise 90 degree power splitter/combiner hybrid 210. Accordingly, embodiments of the disclosure may mix the 0 degree, 90 degree, and 180 degree power splitter/combiner hybrids shown in FIG. 2A, FIG. 2B, and FIG. 2C respectively, so the phases of the completed loops from RPD transmit port 110 to RPD receive port 112 may be uniformly distributed over 360 degree (e.g., 0 degrees, 90 degrees, 180 degrees, 270 degrees).

Figure 5:
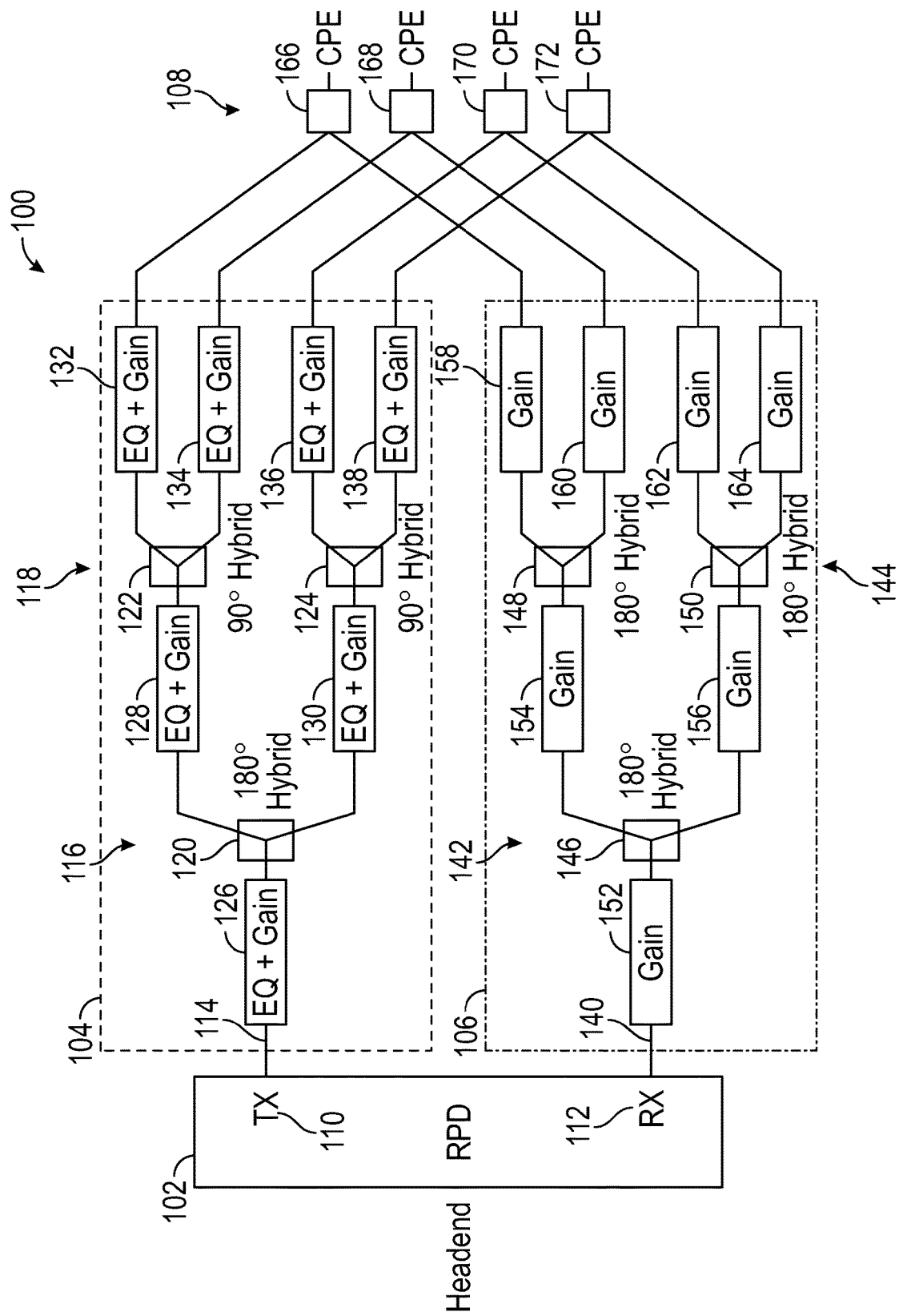
FIG. 5 is a block diagram of a full duplex (FDX) node.

FIG. 5 is a block diagram of FDX node 100 in which the phases of the echoes at RPD receive port 112 comprise 0 degrees from first port 166, 270 degrees from second port 168, 180 degrees from third port 170, and 90 degrees from fourth port 172. In order to accomplish this first splitter 120 may comprise 180 degree power splitter/combiner hybrid 215, second splitter 122 may comprise 90 degree power splitter/combiner hybrid 210, third splitter 124 may comprise 90 degree power splitter/combiner hybrid 210, first combiner 146 may comprise 180 degree power splitter/combiner hybrid 215, second combiner 148 may comprise 180 degree power splitter/combiner hybrid 215, and third combiner 150 may comprise 180 degree power splitter/combiner hybrid 215. Accordingly, embodiments of the disclosure may mix the 0 degree, 90 degree, and 180 degree power splitter/combiner hybrids shown in FIG. 2A, FIG. 2B, and FIG. 2C respectively, so the phases of the completed loops from RPD transmit port 110 to RPD receive port 112 may be uniformly distributed over 360 degree (e.g., 0 degrees, 90 degrees, 180 degrees, 270 degrees).

Figure 6:
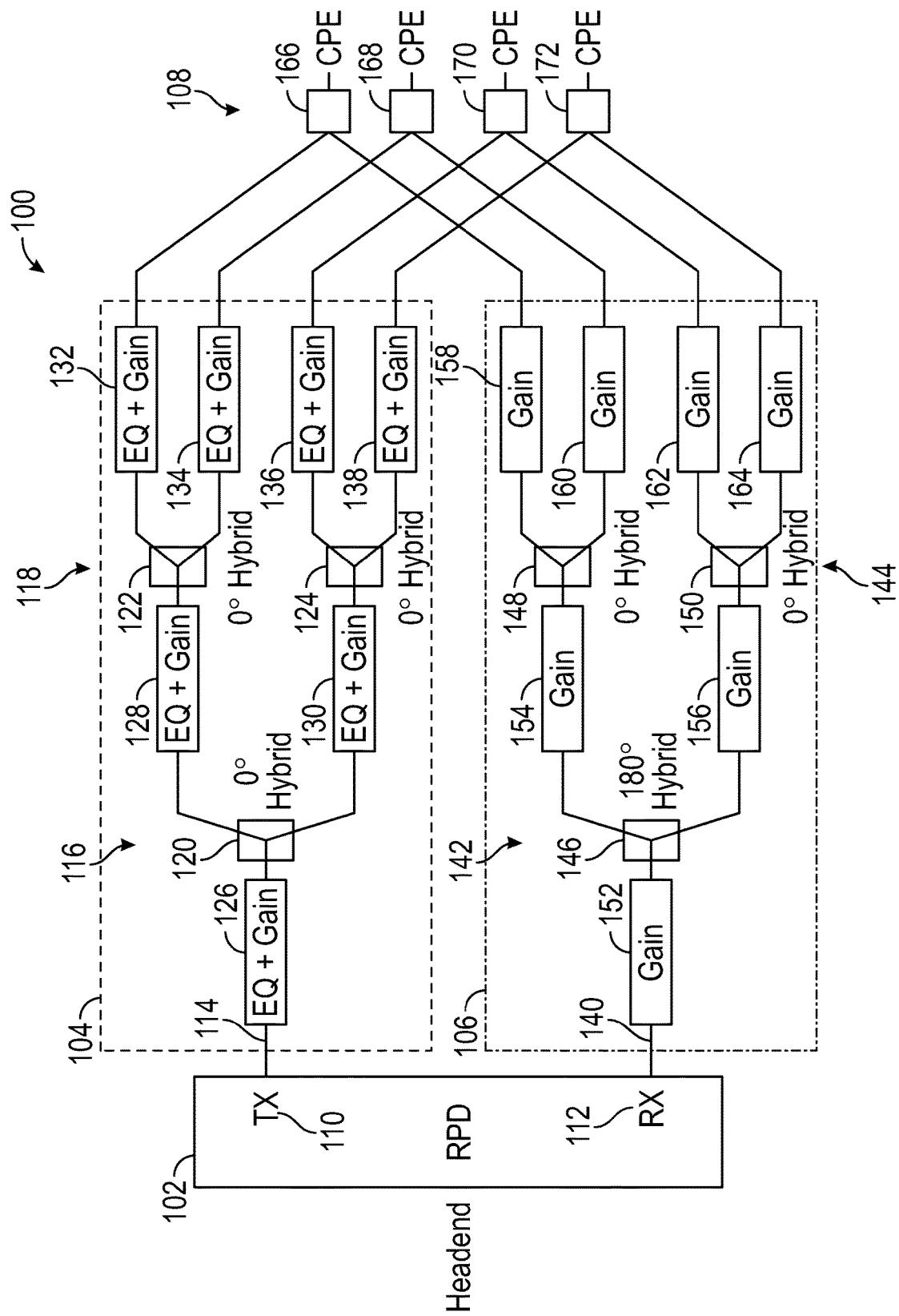
FIG. 6 is a block diagram of a full duplex (FDX) node.

FIG. 6 is a block diagram of FDX node 100 in which the phases of the echoes at RPD receive port 112 comprise 0 degrees from first port 166, 0 degrees from second port 168, 180 degrees from third port 170, and 180 degrees from fourth port 172. In order to accomplish this first splitter 120 may comprise 0 degree power splitter/combiner hybrid 205, second splitter 122 may comprise 0 degree power splitter/combiner hybrid 205, third splitter 124 may comprise 0 degree power splitter/combiner hybrid 205, first combiner 146 may comprise 180 degree power splitter/combiner hybrid 215, second combiner 148 may comprise 0 degree power splitter/combiner hybrid 205, and third combiner 150 may comprise 0 degree power splitter/combiner hybrid 205. Accordingly, embodiments of the disclosure may mix the 0 degree, 90 degree, and 180 degree power splitter/combiner hybrids shown in FIG. 2A, FIG. 2B, and FIG. 2C respectively, so the phases of the completed loops from RPD transmit port 110 to RPD receive port 112 may be uniformly distributed over 360 degree (e.g., 0 degrees, 90 degrees, 180 degrees, 270 degrees).

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
   a transmit portion comprising;
      a transmit portion transmit port, and
      a plurality of splitters;
   a receive portion comprising;
      a receive portion receive port, and
      a plurality of combiners; and a plurality of ports wherein the plurality of splitters and the plurality of combiners scramble phases of completed loops from the transmit portion transmit port to the receive portion receive port resulting from reflections from the plurality of ports.

2. The apparatus of claim 1, wherein the plurality of splitters and the plurality of combiners scramble the phases of the completed loops uniformly over 360 degree.

3. The apparatus of claim 1, further comprising a Remote Physical Device (RPD).

4. The apparatus of claim 3, wherein the RPD comprises an RPD transmit port connected to the transmit portion transmit port.

5. The apparatus of claim 3, wherein the RPD comprises an RPD receive port connected to the receive portion receive port.

6. The apparatus of claim 1, wherein ones of the plurality of splitters comprise one of the following: a 0 degree power splitter/combiner hybrid; a 90 degree power splitter/combiner hybrid; and a 180 degree power splitter/combiner hybrid.

7. The apparatus of claim 1, wherein ones of the plurality of combiners comprise one of the following: a 0 degree power splitter/combiner hybrid; a 90 degree power splitter/combiner hybrid; and a 180 degree power splitter/combiner hybrid.

8. The apparatus of claim 1, wherein the apparatus comprise a Remote Physical Device (RPD) node.

9. The apparatus of claim 8, wherein the RPD node is disposed in an Hybrid Fiber-Coaxial (HFC) network.

10. The apparatus of claim 1, wherein the plurality of ports are respectively connected to a plurality of Customer Premises Equipment (CPE).

11. An apparatus comprising:
a transmit portion comprising;
a transmit portion transmit port, and
a plurality of splitters divided into a first splitter level and a second splitter level, the first splitter level comprising a first splitter and the second splitter level comprising a second splitter and a third splitter;
a receive portion comprising;
a receive portion receive port, and
a plurality of combiners divided into a first combiner level and a second combiner level, the first combiner level comprising a first combiner and the second combiner level comprising a second combiner and a third combiner; and
a plurality of ports wherein the plurality of splitters and the plurality of combiners scramble phases of completed loops from the transmit portion transmit port to the receive portion receive port resulting from reflections from the plurality of ports.

12. The apparatus of claim 11, wherein the plurality of splitters and the plurality of combiners scramble the phases of the completed loops uniformly over 360 degree.

13. The apparatus of claim 11, wherein the first splitter comprise one of the following: a 0 degree power splitter/combiner hybrid; a 90 degree power splitter/combiner hybrid; and a 180 degree power splitter/combiner hybrid.

14. The apparatus of claim 11, wherein ones of the second splitter and the third splitter comprise one of the following: a 0 degree power splitter/combiner hybrid; a 90 degree power splitter/combiner hybrid; and a 180 degree power splitter/combiner hybrid.

15. The apparatus of claim 11, wherein the first combiner comprise one of the following: a 0 degree power splitter/combiner hybrid; a 90 degree power splitter/combiner hybrid; and a 180 degree power splitter/combiner hybrid.

16. The apparatus of claim 11, wherein ones of the second combiner and the third combiner comprise one of the following: a 0 degree power splitter/combiner hybrid; a 90 degree power splitter/combiner hybrid; and a 180 degree power splitter/combiner hybrid.

17. An apparatus comprising:
a Remote Physical Device (RPD) comprising an RPD transmit port and an RPD receive port;
a transmit portion comprising;
a transmit portion transmit port connected to the RPD transmit port, and
a plurality of splitters divided into a first splitter level and a second splitter level, the first splitter level comprising a first splitter and the second splitter level comprising a second splitter and a third splitter;
a receive portion comprising;
a receive portion receive port connected to the RPD receive port, and
a plurality of combiners divided into a first combiner level and a second combiner level, the first combiner level comprising a first combiner and the second combiner level comprising a second combiner and a third combiner; and
a plurality of ports wherein the plurality of splitters and the plurality of combiners scramble phases of completed loops from the transmit portion transmit port to the receive portion receive port resulting from reflections from the plurality of ports uniformly over 360 degree.

18. The apparatus of claim 17, wherein ones of the plurality of splitters comprise one of the following: a 0 degree power splitter/combiner hybrid; a 90 degree power splitter/combiner hybrid; and a 180 degree power splitter/combiner hybrid.

19. The apparatus of claim 17, wherein ones of the plurality of combiners comprise one of the following: a 0 degree power splitter/combiner hybrid; a 90 degree power splitter/combiner hybrid; and a 180 degree power splitter/combiner hybrid.

20. The apparatus of claim 17, wherein the apparatus comprise a Remote Physical Device (RPD) node disposed in an Hybrid Fiber-Coaxial (HFC) network.

* * * * *